US008422763B2

(12) United States Patent
    Gutierrez

(10) Patent No.: US 8,422,763 B2
(45) Date of Patent: Apr. 16, 2013

(54) METHOD FOR COMPARING FIRST COMPUTER-AIDED 3D MODEL WITH A SECOND COMPUTER-AIDED 3D MODEL

(75) Inventor: Steve Gutierrez, Corrales, NM (US)

(73) Assignee: Parametric Technology Corporation, Needham, MA (US)

( * ) Notice: Subject to any disclaimer, the term of this patent is extended or adjusted under 35 U.S.C. 154(b) by 1195 days.

(21) Appl. No.: 12/224,497

(22) PCT Filed: Feb. 28, 2007

(86) PCT No.: PCT/EP2007/001694
    § 371 (c)(1),
    (2), (4) Date: Nov. 7, 2008

(87) PCT Pub. No.: WO2007/098929
    PCT Pub. Date: Sep. 7, 2007

(65) Prior Publication Data
    US 2010/0135535 A1    Jun. 3, 2010

Related U.S. Application Data

(60) Provisional application No. 60/776,939, filed on Feb. 28, 2006.

(51) Int. Cl.
    *G06K 9/00*     (2006.01)
    *G06T 15/10*    (2011.01)
(52) U.S. Cl.
    USPC .......................................... 382/154; 345/427
(58) Field of Classification Search ........................ None
    See application file for complete search history.

(56) References Cited

U.S. PATENT DOCUMENTS

| 6,839,607 B2 * | 1/2005 | Wooten ........................ 700/163 |
| 2003/0135846 A1 | 7/2003 | Jayaram et al. |
| 2004/0249809 A1 * | 12/2004 | Ramani et al. .................. 707/4 |

FOREIGN PATENT DOCUMENTS

| JP | 2001-307111 | 11/2001 |
| JP | 2006-520948 | 9/2006 |
| WO | WO 02/21449 | 3/2002 |

OTHER PUBLICATIONS

Mohamed El-Mehalawi and R. Allen Miller, "A database system of mechanical components based on geometric and topological similarity. Part I: representation", Computer Aided Design 35 (2003) 83-94.*

(Continued)

*Primary Examiner* — Chan S Park
*Assistant Examiner* — Ha Le
(74) *Attorney, Agent, or Firm* — Nelson Mullins Riley & Scarborough LLP

(57) ABSTRACT

The invention relates to a method for comparing a first computer-aided 3D model with a second computer-aided 3D model, the first model being described by a first topology comprising vertices, edges and faces of the first model and the second model being described by a second topology comprising vertices, edges and faces of the second model, the method comprising the following steps: scanning the first topology and the second topology; deriving from the first topology a first topological map relating vertices, edges and faces of the first model and from the second topology a second topological map relating vertices, edges and faces of the second model; determining by means of the topological maps all possible mappings between vertices of the first model and vertices of the second model; using those mapped vertices to identify all possible mappings between edges of the first and edges of the second model; using those mapped edges to identify all possible mappings between faces of the first and faces of the second model; using those mapped elements to linearly compare the first and the second model for geometrical sameness.

8 Claims, 2 Drawing Sheets

OTHER PUBLICATIONS

Mohamed El-Mehalawi and R. Allen Miller, "A database system of mechanical components based on geometric and topological similarity. Part II: indexing, retrieval, matching, and similarity assessment", Computer Aided Design 35 (2003) 95-105.*

Tangelder et al., "A Survey of Content Based 3D Shape Retrieval Methods", Shape Modeling International 2004, Proceedings Genova, Italy Jun. 4, Piscataway, NJ, USA, IEEE, Jun. 7, 2004, pp. 145-157.

Ansaldi et al., "An Eagle-Face Relational Scheme for Boundary Representations", Computer Graphics Forum, vol. 4, Dec. 31, 1985, pp. 319-332.

Flynn et al., "CAD-Based Computer Vision: From CAD Models Relational Graphs", IEEE, Nov. 14, 1989, pp. 162-167.

Huang et al., "Solving CSG equations for checking equivalency between two different geometric models", Computer Aided Design 36, Elsevier Publishers, 2004, pp. 975-992.

* cited by examiner

METHOD FOR COMPARING FIRST COMPUTER-AIDED 3D MODEL WITH A SECOND COMPUTER-AIDED 3D MODEL

RELATED APPLICATIONS

This is a national stage of International PCT Application No. PCT/EP2007/001694, filed Feb. 28, 2007, which claims the priority benefit of U.S. Provisional Application Ser. No. 60/776,939, filed on Feb. 28, 2006, both of which are hereby incorporated by reference.

FIELD OF THE INVENTION

The present invention relates to the technical field of drafting and designing solid bodies by using computer aided drafting and computer aided design tools. Particularly, the present invention relates to a method for comparing a first computer aided 3D model with a second computer aided 3D model. The invention further relates to a computer program product with a computer-readable medium and a computer program, stored on the computer-readable medium with a program code, which is suitable for carrying out such a method when the computer program is run on a computer.

DESCRIPTION OF THE RELATED ART

As an increasing amount of work is subcontracted to suppliers, it has become critical to be able to identify geometrical differences on 3D design models which are being produced by these suppliers regardless of their 3D CAD system which they use within their working environment. Those suppliers may be third party suppliers, external partners of a specific organisation, design engineers within that specific organisation or any other entity having a need to interact with that specific organisation. Often it is necessary, that those differences on 3D design models must be identified. Not only those differences must be identified, but in addition, it is highly desirable to be able to maintain and move forward proprietary information from one system to another. Typically, when information is past from one organization to another, some form of translations process takes place. These translators are growing in usage as more organizations begin to rely on their 3D CAD models. Yet, each time these translations are used, by definition, some information from the source object being translated is lost. The greater the number of iterations which these translators are used, the more likely that data is being lost or changed during the process. Ideally, when a source object is migrated through one or more translations, not only would the user want to identify the differences on the model, but they also want a methodology to migrate their design information, which has been lost during the translation process to the forward to the resulting models received from the supplier.

Today, there exists no general purpose methodology for recognizing differences between two arbitrary models in a timely fashion and supporting the migration of information from one model to another.

SolidWorks Cooperation provides utilities as described at http://www.solidworks.com/pages/products/solutions/docume nts/Utilities_FINAL.pdf. Therein, two solutions are offered. With a feature based solution, a comparison takes place between two versions of the same part. In this case, it has to be started from a common source. Furthermore, the solution is based upon using internal feature information, which restricts the solution to comparing two models produced with the SolidWorks tool. A second approach, a geometry compare tool is used to compare imported bodies coming from different sources. This approach appears to be based upon comparing matching volumes and using this information to highlight differences on the body. Volume matching is prone to resolutions issues and feature recognition reliability.

Tangelder J W H et al: "A survey of content based 3D shape retrieval methods", SHAPE MODELING APPLICATIONS, 2004. PROCEEDINGS GENOVA, ITALY 7-9 JUNE 2004, PISCATAWAY, NJ, USA, IEEE, gives an overview of shape matching methods. Two main groups are identified, namely feature based and graph based. Graph based methods are further divided into model graphs, Reeb graphs and skeletons. Generally speaking, there are provided methods to locate similar objects. The methods try to reduce the problem to basic components and then look for similarities.

U.S. Pat. No. 6,625,607 discloses a method of comparing parts by comparing metadata representing the part topologies to identify identical or near identical parts. The comparison method takes place at a part level. It can distinguish that two parts are different, but can not distinguish at a detail level what those differences are.

Geometric Software Solutions Co. Ltd. distributes a so-called Compare Geometry tool. According to their website (http://geomdiff.geometricsofteware.com) only topological differences can be known, e.g. change in hole diameters.

SUMMARY OF THE INVENTION

Thus, there is a particular need for a rapid, easy and robust method enabling for recognizing differences between two arbitrary models in a timely fashion and for supporting a migration of information from one model to another.

Accordingly, a computer-implemented method for comparing a first computer-aided 3D model with a second computer-aided 3D model, the first model being described by a first topology comprising vertices, edges and faces of the first model and the second model being described by a second topology, comprising vertices, edges and faces of the second model, is disclosed herein, the method being executed by a scanning component, a vertex mapping component, an edge mapping component and a face mapping component and comprising the operations of: scanning the first topology and the second topology, deriving from the first topology a first topology map relating vertices, edges and faces of the first model and from the second topology a second topology map relating vertices, edges and faces of the second model, determining by means of the topological maps all possible mappings between vertices of the first model and vertices of the second model, using those mapped vertices to identify all possible mappings between edges of the first and edges of the second model, using those mapped edges to identify all possible mappings between faces of the first and faces of the second model, and using those mapped elements to linearly compare the first and the second model for geometrical sameness.

The method disclosed herein solves the geometrical problem, mentioned above, primarily in a non-geometric manner. The method addresses both, the issue of comparing any two arbitrary solid models, regardless of the system used to generate those models, provided they can be converted into a so-called boundary representation and of providing mapping knowledge necessary to migrate information between these two arbitrary models which may be of interest to a user. The aforementioned boundary representation is today the common denominator of nearly all of today's solid modelling solutions. For more details about solid modelling representation see, for example; the standard book "An Introduction to Solid Modeling" from Martii Mäntylä.

Using information, which is available for the first and second models, the topology of each model is first scanned. The topology represents generally a connectivity of each of the boundary elements, which make-up a solid model, i.e. a 3D model. In the following, the wordings "solid model" and "3D model" are used synonymously. This provides a connectivity network relating each face, edge and vertex of the modelled body. Furthermore, the method, as disclosed herein, provides a mapping knowledge, necessary to migrate information between two arbitrary models, which is of interest to a user. This mapping knowledge is critical to successfully moving information from one arbitrary model to another and allowing the design to continue without loss of information. Furthermore, it is highly likely, that the source organisation will continue to evolve their own designs, while their suppliers or other parts of their own organisation operate on their related models. In such a complex operating environment, synchronizing or reconciling information from these various models is key to supporting a co-development environment.

One further embodiment of the method according to the present invention comprises the step of producing a map, which relates all mapped faces, edges and vertices between the first and second models, the map being used by verifications routines. All mapping knowledge necessary to migrate information between the first and the second models is integrated.

It is also possible, in a further embodiment of the method according to the present invention, that the further step of classifying each face, edge or vertex of the first and/or second model as one of three conditions, namely as a difference, as a modification or as an equivalent, is implemented.

In another embodiment of the method according to the present invention, the possible mappings between the vertices of the first and the second models is performed by using coordinates as matching criteria.

Still another embodiment of the method according to the present invention further comprises as a subsequent iteration the step of repeating all preceding steps with the first and second models being reversed. Since new faces may exist on the second model, which were never considered by a preceding mapping routine, the processing can be completed by reversing the mapping process. Furthermore, it is possible, that in the subsequent iteration, only elements are considered, which remained unmapped in the preceding iteration. This greatly reduces the amount of possible elements for the mapping process to consider and therefore should operate in only a fraction of the time of the original iteration.

According to a further embodiment of the method according to the present invention vertices, edges and faces of the first and second models are represented by appropriate data structures, respectively, the respective data structures are further collected in corresponding look-up tables.

The present invention also refers to a computer program product with a computer-readable medium and a computer program stored on the computer-readable medium with a program code, which is suitable for carrying out a method according to the present invention, when the computer program is run on a computer.

The present invention also relates to a computer program with a program code, which is suitable for carrying out a method according to the present invention, when the computer program is run on a computer.

The present invention also refers to a computer-readable medium with a computer program stored thereon, the computer program comprising a program code, which is suitable for carrying out a method according to the present invention when the computer program is run on a computer.

Further features and embodiments of the invention will become apparent from the following detailed description and the accompanying drawings.

It will be understood, that the features mentioned above and those described hereinafter can be used not only in the combination specified, but also in other combinations or on their own, without departing from the scope of the present invention.

The invention is schematically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION

Figure 1:
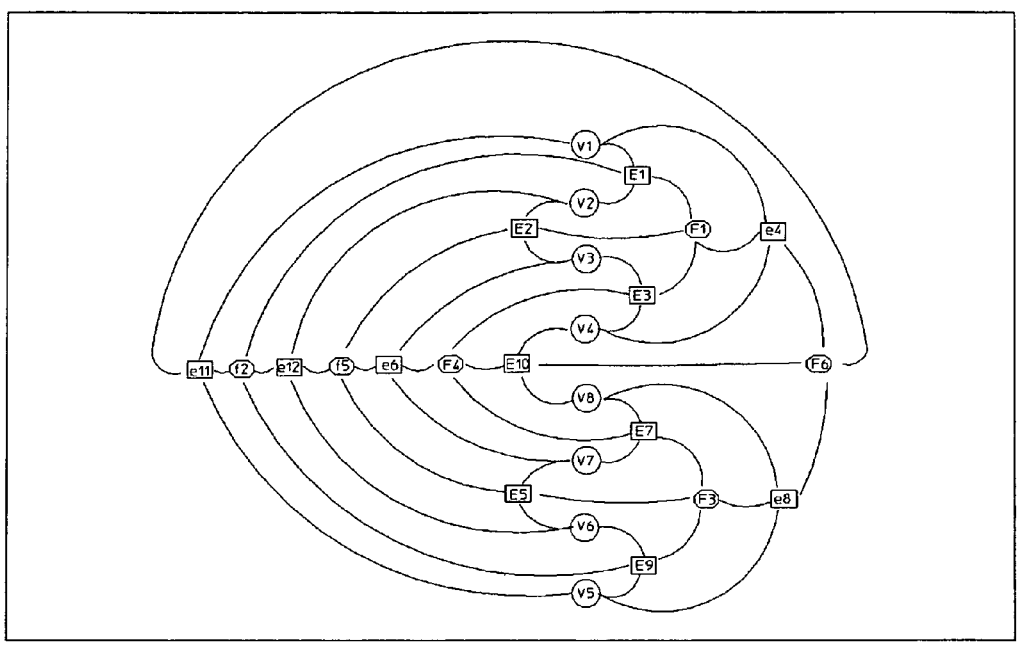
FIG. 1 is a schematical view of a topological map of a cube as it can be used in an embodiment of the method according to the present invention.

FIG. 1 shows a topological map of a cube as a simple example for a connectivity network as it can be used within an embodiment of the method according to the present invention.

Where v1-v8 represents each of the 8 vertices of a cube, e1-e12 represent each of the 12 edges on the cube, and f1-f6 represent each face on the cube. Each arc segment in the above diagram represents the connectivity of these various elements in a cube. Given two such topological maps (from two arbitrary 3D models, i.e. solid models), it is not possible to determine orientation, size or shape of the object being represented by the given map. In fact, given the diagram above, the object may be a cube, a rectangle or it may be any arbitrary 6 sided object bounded by 4 edges each with a total of 8 vertices. To determine how to relate these topological maps between two objects of interest, namely a first model and a second model (source and target bodies), it is necessary to provide some "anchoring" of the topology. By providing anchor points, the topology of the bodies of interest can be used to provide a mapping from one element to another on the two corresponding 3D models, i.e. solid models. According to the present invention it is proposed that the vertices of the model can be used to anchor the topological representation of the two models being compared for differences. Within a given resolution, at most one vertex from each body can share the same position. Once a source and target vertex is found sharing the same position in 3D-space, the vertex is considered mapped. After all possible vertex mappings have been identified; those mappings are then used to identify possible edge mappings. For each edge on a solid model, it may reference at most one or two vertices. If all vertices of an edge are mapped, then this edge can now be marked as mapped. For each face on a solid model, it may be bounded by one or more edges. Given one (special case condition) or more mapped edges, the corresponding face can be uniquely identified and therefore mapped. Since at most, two mapped edges are required to uniquely identify a face, this methodology intrinsically has robustness built into the mapping process as only a portion of the available edges must be mapped to identify a face. Once the entire topological structure has been processed, all mapped elements provide the necessary information to relate one element to another between the source and target solid models, i.e. between the first and the second 3D models. With these relations now established, the model can then be linearly compared for geometrical sameness. (In other words, the mapping information removes the requirement for iterating through the elements of the source and target models looking for geometrical sameness.) All mapped faces found to be geometrically different are considered to be modifications between the source and target objects. All unmapped elements can be considered as representing the differences between the two models. A more complete description of the entire mapping process as proposed by the present invention is given hereinafter, describing in detail each of the steps involved in the proposed methodology.

The invention converts what has been traditionally an iterative process and establishes a methodology to convert the problem into a linear approach. This greatly reduces the computational effort required to resolve the problem. Furthermore, it solves an inherently geometrical problem by in fact performing a very limited number of geometrical checks. Combining these two benefits yields a solution which has the following benefits:

It is relatively insensitive to complex insatiable geometrical conditions which may exist on the models being compared which traditionally have created complex conditions for the model to contend with. This includes items such as:
  Incompatible geometric resolution factors between two bodies,
  Geometrical elements at or near the geometric resolution of the object being compared,
  Unstable geometry conditions such as singularities,
  Complex geometry definitions.

Furthermore, any embodiment of the method according to the present invention operates equally well on manifold or non-manifold bodies, and in any combination.

Moreover, it operates equally well on native or foreign generated parts which have been imported into a specific source system.

The method uses no intrinsic knowledge within the host system to resolve differences.

It is an inherently fast procedure since it does little computational work but rather is primarily a logic approach which makes decisions based upon the topological representation of the respective model. Although it is not reliable to quantify the speed of the methodology (due to differences in computer processing power), it is at least 10× higher than other comparable solutions.

Time to resolve differences grow linearly with the number of elements to resolve. The method according to the present invention is relatively insensitive to the geometric complexity of the objects being compared.

Geometric perturbations which are introduced by translators can be resolved in a method so as not to interfere with this process.

The method is inherently robust as only a portion of the topology needs to be mapped to resolve the differences between the source and target bodies, i.e. the first model and the second model.

Once the method has completed, a complete map exists to relate every mapped element (vertex, edge, face) on the source object to the corresponding object being compared and vice versa.

With the mapping information, one can determine how to migrate information forward to the corresponding body following whatever rules are imposed by a host system.

In the following, a detailed description of a possible embodiment of the method according to the present invention is given.

The method described here for comparing two arbitrary solid models can be applied to any boundary representation solid model. To help clarify the operation of the methodology, this description will regularly refer to the operation of the specific implementation of the so-called "Model Comparator" as supplied by the company CoCreate.

In the following, the first model is referred to as a source body and the second model is referred to as a target body.

The four basic components of the method are described in the following. Each component successively deals with more specific elements of the methodology. The four components consist of:
  Scanning and post processing activities
  Face mapping techniques
  Edge mapping techniques
  Vertex mapping techniques Scanning and Post Processing Activities Component The first component is the starting point for the method. The first component primarily consists of the pre-processing and post-processing activities associated with the method. The pre-processing activities are described in steps 1-3 while the post processing activities are described in parts A to C.

1. The source body, i.e. the first model, is scanned and a topology map consisting of at least all faces, edges and vertices on the body is established. If desired, additional information such as loops and shells can also be collected at this time.

a) The process of scanning topology in a boundary-representation solid model is a common and well understood process. For more information, see for example, the standard book "An Introduction to Solid Modeling" from Martti Mäntylä. Typically, recursive or looping algorithms are used to construct a topology map. As this is a common procedure, no specific details are provided here. However, it is sufficient to state that the procedure used to construct the topology map is not critical to this method. As long as a complete mapping exists for the entirety of the model or for those areas of interest on the model, it is not relevant how or in what order that information was collected. Shown below is a description of the process used by the specific implementation of the above mentioned Model Comparator.

Given a body, all faces on that body are selected. The order of the faces is not important or relevant to the process.

For each face, a data structure to represent this face and the related topological information is first constructed. An example of this could be presented by the following table:

TABLE 1

Example structure for topology of a face

| Data type | Data description |
| --- | --- |
| Face | Unique handle to this single face |
| Edge-list | Unique handle to edges bounding this face |

Once the face data structure has been constructed, all edges of that face are selected. The face structure is populated with the handle of the face along with the handles for all edges which bound this face. For performance reasons, all face structures should be collected into a data structure which allows for fast lookup which will be used heavily during the mapping process. In the specific implementation, a hash table was constructed to contain all face structures whose hash-key was the handle to the face.

For each edge referenced by the face above, a data structure is first constructed to represent this edge and the related topological information. An example of this could be presented by the following table:

TABLE 2

Example structure for topology of a edge

| Data type | Data description |
|---|---|
| Edge | Unique handle to this single edge |
| Vertex-list | Unique handle to vertices bounding this face |

Once the edge data structure has been constructed, all vertices of that edge are selected. The edge structure is populated with the handle of the edge along with the handles for all vertices which bound this edge. For performance reasons, all edge structures should be collected into a data structure which allows for fast lookup which will be used heavily during the mapping process. In the specific implementation, a hash table was constructed to contain all edge structures whose hash-key was the unique handle to the edge. If this edge had been previously scanned, this step can be skipped.

For each vertex referenced by the edge above, a data structure is first constructed to represent this vertex and the related coordinate information. An example of this could be presented by the following table:

TABLE 3

Example structure for topology of a vertex

| Data type | Data description |
|---|---|
| Vertex | Unique handle to this single vertex |
| Coordinate | Coordinate of this vertex in 3-space |

Once the vertex data structure has been constructed, the 3-space coordinate of this vertex is determined. The vertex structure is populated with the handle of the vertex along with the coordinate of this vertex. For performance reasons, all vertex structures should be collected into a data structure which allows for fast lookup which will be used heavily during the mapping process. For this, a hash table can be constructed to contain all vertex structures whose hash-key is the unique handle to the vertex. If this vertex has been previously scanned, this step can be skipped.

b) Optional Information

If available, the topological scanners described above could also include shell and loop information. This additional information is not required, but can improve the mapping process by providing additional information. Shells can be used to differentiate faces associated with one or more internal voids within a solid model. Loop information can be used to differentiate edges of a face which are representing one or more internal boundaries and the single external perimeter of a given face.

2. Once the source body has been scanned, the target body, i.e. the second model, is scanned and a topology map consisting of all faces, edges and vertices on the body is established using the same procedure described above.

3. The faces on the source body are mapped to the target body. This step likely represents the most critical component of the entire process.

4. To this point, the method is based upon scanning the source body and then finding a corresponding element on the target body. This could mean that some target elements are never visited in any way which means they would be marked as unmapped. The solution to this issue is to repeat Step 3 in its entirety where the source and target bodies are reversed (i.e. instead of mapping elements from the source body onto the target body, map the elements from the target body onto the source body). Since new faces may exist on the target body which were never considered by the mapping routines, the processing is completed by reversing the mapping process. The second iteration through the mapping process should only consider those elements which remain unmapped. This greatly reduces the amount of possible elements for the mapping process to consider and therefore should operate in only a fraction of the time of the original iteration through Step 3.

Once the mapping process has been completed, a map is produced which relates all known faces, edges and vertices between the source and target bodies. This information is then used by verifications routines to establish that the mapping process has indeed found a reasonable solution. This is done by performing geometrical verifications of the mapped faces. All faces on the source and target body are classified as one of three conditions:

A) For those faces which no corresponding mappings are found, they are classified as differences. If differences exist on the source body, these represent faces which no corresponding face can be found on the target body and usually represent faces which have been destroyed. If the difference exists on the target body, these represent faces which have no corresponding face on the source body and usually represent new faces which have been constructed. For these faces, no further information is available to relate these faces. At this point, feature recognitions tools, heuristic algorithms and/or user intervention could be used to further refine the mapping results.

B) Those faces which have been mapped by the above processes can be verified for sameness by using geometrical checks. Depending on the definition of sameness, different levels of equivalency can be determined. In other words, a specific implementation can decide the level of sameness for their application which may range from an exact match to being similar or other condition. All faces which are found to be geometrically "equivalent" are classified as being the same face. It should be noted that, using the mapping information, geometrical equivalency checks are always performed between a pair of elements (source and target elements), and can be done in a simple linear fashion. No iteration is required or desired.

C) Those faces which have been mapped by the above processes and are found to not be geometrically "equivalent", are classified as modifications. These faces appear to be the same topologically, but they do not share the same geometrical definitions. This condition is typical when faces have been moved, rotated, tapered or some other operation. Depending on the specific implementation, this information can be used to possibly align the geometry to one another or to propagate the geometrical differences forward or backward.

After all faces have been classified, the specific implementation can use this information in various ways which may be useful for showing differences, reconciling non-geometrical information between the source and target bodies, or even possibly to migrate the geometrical differences forward or backward as suggested above.

The approach provided by the present invention and described here takes a linear approach to the problem of finding differences between the source and target bodies. This avoids the highly iterative process of solely trying to map faces geometrically. Minimal geometrics checks are done and only done when clarification is required to resolve ambiguities found during the mapping process. This creates a methodology which is very stable and quite insensitive to unstable geometric situations.

Geometrical checks can be a tricky thing to do when trying to map corresponding elements. Edges and faces can be shortened, lengthened, or even change form from linear to circular or some other type. The fewer geometrical checks that are required to be performed during the mapping process, the faster the comparison can be made. On the other hand, some checking should be done so that proper anchoring of the topology can occur at all levels (not just at the vertex level).

The embodiment of the method according to the present invention which is described above is highly effective when a sufficient number of mapped vertices exist to anchor the edges of the compared bodies. However, when certain geometrical changes are made, there may be a very limited or no common vertices. This produces a greater number of unmapped faces which ultimately make it more difficult to establish a model useful for reconciliation. In this case, according to a further embodiment of the invention, loop information (if available) is used which would help to establish further mapping information. By following the peripheral loop and using the ordered information provided by the loop, this information can be used to establish a high quality mapping even if the geometry of the edges should change. By addressing these issues the amount of unmapped elements can be reduced which ultimately creates a higher level of success in producing a reconciliation process.

Vertex Mapping Techniques Component

The process of mapping vertices which represents one step in an embodiment of the method according to the invention, is based upon the simple process of matching coordinates between the target and source body. After the scanning step, i.e. the scanning process has been completed, this part of the process attempts to anchor the topology map so that it is possible to map elements on one body to another. Within the resolution of any given part, it should be impossible for two vertices to share the same coordinate. When comparing bodies of different resolutions, the lower of the two is used for matching coordinate information.

Figure 2:
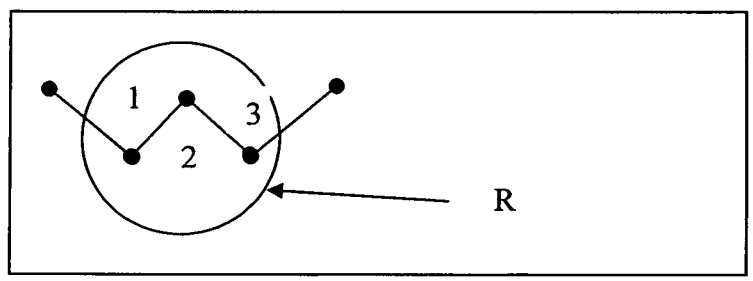
FIG. 2 shows multiple vertices within a resolution region.

The method for vertex mapping involves:
1. Scanning through each vertex on the source body found during the scanning process.
2. Determining if a vertex on the target body exists at the same location using the coordinate information associated with the source body.
a) Using the lower of the two resolutions, sameness is determined by checking for equality of positions within the specified resolution. This simple approach addresses the complex problem of dealing with different resolutions. Should a condition occur where ambiguity exists, (i.e. multiple vertices exists within the resolution region of the lower resolution part), these vertices will simply remain unmapped. During later stages of the process, the corresponding edges and faces would likely remain unmapped as well. This result is consistent within the methodology since those unmapped elements do not exist on both models. As an example, consider the situation, shown in FIG. 2.

With this situation, one vertex within the resolution region R may be mapped to a specific vertex with a specified coordinate. The remaining vertices would remain unmapped. This condition would ultimately lead to these items being classified as differences which is exactly the solution desired.

b) Because of the large number of vertices which may exist, performance is important to this step of the process. As suggested previously, a specific implementation should setup a data structure which can be used to quickly lookup a vertex by a given coordinate. A lookup method is highly desirable over a scanning process. Imagine a body with 4,000 vertices each. A simple scanning approach would require 1.6 million iterations to resolve each possible vertex.

c) Within the specific implementation of the above mentioned Model Comparator, a lookup table is constructed which is indexed by the 3-space coordinate of the vertices. To further optimise the solution, as each vertex is matched, the matched vertex could be eliminated from the lookup table so that the further processing will be accelerated.

d) Once a corresponding vertex is found on the target body, the vertex is considered mapped and this information is recorded to the vertex structure on both the source and target bodies.

TABLE 4

Example vertex data structure with mapping information

| Source Vertex data structure | |
|---|---|
| Vertex | Unique handle to source vertex |
| coordinate | 3-space coordinate of source vertex |
| Mapped Vertex | Unique handle to mapped target vertex |

| Target Vertex data structure | |
|---|---|
| Vertex | Unique handle to target vertex |
| coordinate | 3-space coordinate of target vertex |
| Mapped Vertex | Unique handle to mapped source vertex |

Edge Mapping Techniques Component with Propagation

The process of mapping edges representing a further step of an embodiment of the method according to the present invention uses the results of the vertex mapping procedure to establish the relationship between edges on the source and target bodies. The greater the number of mapped vertices that are produced from the vertex mapping component, the greater the number of edges can be resolved. This procedure's predictability depends on how aggressively one tries to resolve unmapped vertices using propagation rules. The methodology described here, applies several propagation rules and iterates the entire map edge component until no additional mappings are resolved. Each specific implementation may attempt variations of what is described here.

The edge mapping method involves:
1. Mapping the vertices using coordinates as the matching criteria.
2. Determining if all vertices of a given edge on the source body have been mapped. If not, add it to a list of unresolved edges and continue to the next edge.

When all vertices of a given edge are mapped, this edge can use this mapping information to map itself. The first step of the method is to locate the corresponding edge on the target body using the mapped vertex information.

a) Using the mapped vertices, all possible edges which pass through those mapped vertices on the target body are identified. This can be accomplished by first selecting all edges which pass through the first mapped vertex. Then all the edges which pass through the second mapped edge are selected. The union of these two results provides all possible edges on the target body which can be mapped to the edge of interest on the source body. If only one edge meets this criterion, then this edge can be uniquely mapped and can populate the edge data structure as shown below.

TABLE 5

Example edge data structure with mapping information

| Source edge data structure | |
|---|---|
| edge | Unique handle to source edge |
| Vertex list | List of vertices bounding this edge |
| Mapped Edge | Unique handle to mapped target edge |

| Target Vertex data structure | |
|---|---|
| Edge | Unique handle to target vertex |
| Vertex list | List of vertices bounding this edge |
| Mapped Edge | Unique handle to mapped source edge | b) If multiple edges are found to be bound by the mapped vertices, several options exist to resolve which edge represents the correct mapping. Multiple matches are possible when dealing with edges that have a single vertex or two non-linear edges which share the same two vertices.
  i. One option is to resolve the ambiguity geometrically. One can take an arbitrary point of the source edge and determine if any of the target candidates shares this point within the geometrical resolution which has been previously set. Multiple solutions should not exist at this point since that would represent self-intersecting curves. This procedure should only be attempted on edges whose length is at least 2× that of the geometrical resolution. If the edge is shorter than this minimum length, one can not determine with confidence if the point lies on the curve. In this case, the edge should be marked as unmapped and the process continued.
  ii. Using geometrical techniques to resolve ambiguous mappings is not the ideal methodology to use. Edges may not be in the same 3d space or they may have been trimmed/extended from their original configuration. Therefore, an alternative method to resolve the ambiguity would be to use additional topology information to resolve the situation. In this case, one can query all the faces associated with the ambiguous target edge. If all connected faces are mapped, then the ambiguous edge can be uniquely identified without any geometrical checks.
3. The third step involved in the edge mapping component is that of mapping edges which have one unmapped vertex associated with it. Using basic topological rules, additional mappings may be found.
a) Each unresolved edge is looped through and it is determined if it has at least one mapped vertex along with one unmapped vertex. If this situation exists, further edges may be resolved.
b) Given an edge with a single mapped vertex, all unmapped edges which share this mapped vertex are found. If there is only one unmapped edge, then it is determined whether the same situation exists on the target body. If both the source and target bodies contain one unmapped edge which shares the known mapped vertex, then map this edge and remove this edge from the list of unmapped edges.
c) If more than one unmapped edge shares this mapped vertex, one could use either or both of the techniques described in 2b-i, 2b-ii above to resolve the ambiguity.
d) When the ambiguity can be resolved, the edge data structure is first populated with the mapping information and this edge is removed from the list of unresolved edges. In addition, one can now mark the previously unmapped vertex as a mapped vertex by populating the vertex data structure as described in the Map Vertex Component. At this point, it is known with certainty that these points do not share the same coordinate, but logically they represent the same location in topology. This propagation technique allows logical mappings to be found even though they may have different physical mappings.
e) If any edges have been resolved during this phase of the process, steps 2 and 3 are repeated in their entirety. Additional iterations could resolve additional mappings since additional vertices may have been mapped. This iteration is continued until no further edges have been resolved.
4. Optional mapping extensions are available if the host system has the concept of shared geometry. It is common practice in many systems where different topological elements can refer to the same geometrical definition. This may occur, for example, when two linear edges are collinear and both edges refer to the same underlying curve definition. If this is the case, then additional mappings may be resolved. For each mapped edge, the corresponding curve definition can be identified. If multiple edges are found to refer to this one curve, these are established as secondary mappings. For each secondary mapping on the source body, the corresponding edge on the target body is identified. Once again, the corresponding curve is determined and all edges which refer to this curve are identified. With this additional information, secondary mappings between the source and target body can be further established.

Face Mapping Techniques Component with Propagation

The process of mapping faces representing a further step of an embodiment of the method according to the present invention uses the results of the edge mapping procedure to establish the relationship between faces on the source and target bodies. The greater the number of mapped edges that are produced from the edge mapping component, the greater the number of faces which can be resolved. The predictability of this procedure depends on how aggressively one tries to resolve unmapped edges using propagation rules. The higher the quality of mapping edges, the greater the success in mapping faces.

The methodology for mapping faces consists of the following steps:
1. A map of edges is created, which provides a mapping of all available edges between the source and target bodies. This mapping information is used as the basis for the following steps described here.
2. For each face on the source body, it is determined whether they are bound by two or more mapped edges. If this condition exists, the face can be immediately mapped without further investigation since two edges can uniquely identify a face. Some minimal geometric checks may be desired to verify that a reasonable mapping has been identified. This would eliminate the possibility of mapping a planar face to a blend face which topologically has the same representation. Using these two mapped edges the face structure can be populated as shown below:

TABLE 6

Example face data structure with mapping information

| Source Face data structure | |
|---|---|
| Face | Unique handle to source face |
| Edge list | List of edges bounding this face |
| Mapped Face | Unique handle to mapped target face |

| Target Face data structure | |
|---|---|
| Face | Unique handle to target face |
| Face list | List of edges bounding this face |
| Mapped Face | Unique handle to mapped source face |

3. For faces bounded by a single edge, additional investigation is required to determine a unique solution. A single mapped edge is bound by up to two faces. To determine which of the two faces are bounded by the single edge, the first step is to remove any mapped faces from the two possible candidates. Only unmapped faces are possible candidates. If there continues to be more than one possible solution, simple geometric checks could be used to identify the proper mapping. The first level check is to determine which of the two possible faces on the target body have the same geometric types (i.e. they are both planes). The second level check is to determine if they share a common point on the surface.
4. After all direct mapping has occurred, further mappings may be resolved using an iterative approach described below.
a) All unmapped faces on the source body are scanned though.
b) If all faces adjacent to the given unmapped face are mapped then it may be possible to resolve this unmapped face. First, it is necessary to verify if this situation exists on the target body. This is accomplished by selecting each of the mapped faces on the target body and then determining if a single unmapped face is bounded by those mapped faces. If both the source and target body contain the same condition for the unmapped face of interest, this face can be now mapped uniquely.
c) Specific implementations may choose to use additional propagation rules in addition to that described here.
d) Step 4 is repeated in its entirety until no further unmapped faces are resolved.
5. All remaining unmapped faces can be resolved geometrically by:
a) Looping through all unresolved faces on the source body
   i. Checking if an unresolved face on the source body has an "equivalent" geometry definition by scanning through each unresolved face on the target body.
   ii. If it does, it is mapped and removed from the list of remaining unmapped faces.
b) This is a time consuming process, so this iterative process is only used when the number of unresolved faces is less than configurable limit.
6. Optional mapping extensions are available if the host system has the concept of shared geometry. It is common practice in many systems where different topological elements can refer to the same geometrical definition. It was found that certain modelling operations can cause a single face to have a correspondence to one or more faces. Similarly, operations can cause multiple faces to be most accurately represented by a single face. Consider the case of a planar face being split into two faces by a groove. This leads to the concept that it may be desired to allow a single face to be mapped into multiple faces on the other body. To deal with this possibility, surface information is the key to resolve this condition. If topological elements share the same underlying geometry information, this information can be used to assist in the mapping processes.

To address the concept of multiple mappings, an additional data field called "secondary mappings" has been established for both face and edge data structures. This new data field allows information to be carried when multiple mappings are encountered. Before populating this field, the scanning routines need to look for topological elements which have shared geometric definitions. For example, there may exist the situation where two faces both refer to the same planar definition. There are two conditions which can cause the secondary mappings field to get populated. The first occurs when the process encounters a face or edge which shares its definition with another. The element that is currently being mapped is assigned as the primary mapping element. Other elements which share the same geometrical definitions are assigned as secondary mappings provided they have not been previously mapped. The second condition occurs when multiple topological elements are found to map onto a single geometrical element. This can occur when two faces on the source body are merged into a single face on the target body. Should this condition occur, the secondary mappings field is used to carry this information which can then be used for reconciliation.

The invention claimed is:

1. A computer-implemented method for comparing successively a first computer-aided 3D model with a second computer-aided 3D model, the first model being described by a first topology comprising vertices, edges and faces of the first model and the second model being described by a second topology comprising vertices, edges and faces of the second model, the method being executed by a scanning component, a vertex mapping component, an edge mapping component and a face mapping component, the method comprising:

scanning the first topology and the second topology;

deriving from the first topology a first topological map relating vertices, edges and faces of the first model and from the second topology a second topological map relating vertices, edges and faces of the second model;

determining by means of the topological maps all possible mappings between vertices of the first model and vertices of the second model to generate mapped vertices;

using the mapped vertices to identify all possible mappings between edges of the first model and edges of the second model to generate mapped edges;

using the mapped edges to identify all possible mappings between faces of the first model and faces of the second model to generate mapped faces; and using the mapped vertices, edges and faces to linearly compare the first model and the second model for geometrical sameness.

2. The method according to claim 1, further comprising the step of producing a map which relates all mapped faces, edges and vertices between the first and second models, the map being used by verifications routines.

3. The method according to claim 2, further comprising the step of classifying each face, edge or vertex of the first model and/or of the second model as one of three conditions, namely as a difference, as a modification or as an equivalent.

4. The method according to claim 1, wherein the possible mappings between the vertices of the first and the second models is performed by using coordinates as matching criteria.

5. The method according to claim 1, further comprising as a subsequent iteration the step of repeating all preceding steps with the first and second models being reversed.

6. The method according to claim 5, wherein in the subsequent iteration only elements are considered which remained unmapped in the preceding iteration.

7. The method according claim 1, wherein vertices, edges and faces of the first and second models are represented by appropriate data structures, respectively, the respective data structures are further collected in corresponding look-up tables.

8. A non-transitory computer-readable medium with a computer program stored thereon, the computer program comprising a program code comprising the steps of:

scanning the first topology and the second topology;

deriving from the first topology a first topological map relating vertices, edges and faces of the first model and from the second topology a second topological map relating vertices, edges and faces of the second model;

determining by means of the topological maps all possible mappings between vertices of the first model and vertices of the second model to generate mapped vertices;

using the mapped vertices to identify all possible mappings between edges of the first model and edges of the second model to generate mapped edges;

using the mapped edges to identify all possible mappings between faces of the first model and faces of the second model to generate mapped faces; and using the mapped vertices, edges and faces to linearly compare the first model and the second model for geometrical sameness.

* * * * *